(12) United States Patent
Ptasienski et al.

(10) Patent No.: US 8,658,949 B2
(45) Date of Patent: Feb. 25, 2014

(54) ADAPTABLE LAYERED HEATER SYSTEM

(71) Applicant: Watlow Electric Manufacturing Company, St. Louis, MO (US)

(72) Inventors: Kevin Ptasienski, O'Fallon, MO (US); James McMillin, Algonquin, IL (US); Rolando O. Juliano, Hannibal, MO (US); Gregory J. Lammert, Columbia, IL (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 13/965,391

(22) Filed: Aug. 13, 2013

(65) Prior Publication Data
US 2013/0327762 A1    Dec. 12, 2013

Related U.S. Application Data

(62) Division of application No. 10/941,609, filed on Sep. 15, 2004, now Pat. No. 8,536,496.

(51) Int. Cl.
*H05B 3/16* (2006.01)
*H05B 3/02* (2006.01)

(52) U.S. Cl.
USPC .......................................... 219/543; 219/538

(58) Field of Classification Search
USPC .................................................. 219/543, 538
See application file for complete search history.

*Primary Examiner* — Brian Jennison
(74) *Attorney, Agent, or Firm* — Brinks Gilson & Lione

(57) ABSTRACT

A layered heater is provided that comprises at least one resistive layer defining a circuit configuration, the circuit configuration comprising at least one resistive trace oriented relative to a heating target and comprising a material having temperature coefficient characteristics such that the resistive trace provides power commensurate with demands of the heating target In one form, resistive traces of the resistive layer are an NTC material having a relatively high BETA coefficient and are oriented approximately parallel to a primary heating direction.

20 Claims, 15 Drawing Sheets

ADAPTABLE LAYERED HEATER SYSTEM

CROSS REFERENCE TO RELATED APPLICATIONS

This divisional application claims the benefit of U.S. patent application Ser. No. 10/941,609, filed on Sep. 15, 2004. The disclosure of the above application is incorporated herein by reference.

FIELD

The present disclosure relates generally to electrical heaters and more particularly to devices and methods for achieving a relatively constant temperature distribution in the presence of local heat sinks.

BACKGROUND

Layered heaters are typically used in applications where space is limited, when heat output needs vary across a surface, where rapid thermal response is desirous, or in ultra-clean applications where moisture or other contaminants can migrate into conventional heaters. A layered heater generally comprises layers of different materials, namely, a dielectric and a resistive material, which are applied to a substrate. The dielectric material is applied first to the substrate and provides electrical isolation between the substrate and the electrically live resistive material and also reduces current leakage to ground during operation. The resistive material is applied to the dielectric material in a predetermined pattern and provides a resistive heater circuit. The layered heater also includes leads that connect the resistive heater circuit to an electrical power source, which is typically cycled by a temperature controller. The lead-to-resistive circuit interface is also typically protected both mechanically and electrically from extraneous contact by providing strain relief and electrical isolation through a protective layer. Accordingly, layered heaters are highly customizable for a variety of heating applications.

Layered heaters may be "thick" film, "thin" film, or "thermally sprayed," among others, wherein the primary difference between these types of layered heaters is the method in which the layers are formed. For example, the layers for thick film heaters are typically formed using processes such as screen printing, decal application, or film dispensing heads, among others. The layers for thin film heaters are typically formed using deposition processes such as ion plating, sputtering, chemical vapor deposition (CVD), and physical vapor deposition (PVD), among others. Yet another series of processes distinct from thin and thick film techniques are those known as thermal spraying processes, which may include by way of example flame spraying, plasma spraying, wire arc spraying, and HVOF (High Velocity Oxygen Fuel), among others.

In many heating applications, a constant temperature across or along a heating target, e.g., a part such as a pipe or an outside environment to be heated, is often desired in order to maintain relatively steady state conditions during operation. For example, a constant temperature along a hot runner nozzle for injection molding equipment is desirous in order to maintain the molten resin that flows within the nozzle at a constant temperature and optimum viscosity for processing. However, each end of the hot runner nozzle presents a local heat sink relative to the overall hot runner nozzle. One end is connected to a manifold, which draws more heat away from the heater, and the other end, the tip, is exposed to the injection cavities/dies, which also draws more heat away from the heater. As a result, non-uniform heat transfer to the molten resin often occurs along the length of the hot runner nozzle, which translates into non-uniform temperature distribution and non-uniform viscosity of the molten resin. When the molten resin has a non-uniform temperature distribution, the resulting injection molded parts often contain defects or may even be scrapped. Increased machine cycle time can also be a result thereof.

To address this problem, existing prior art hot runner nozzle heaters have been designed with a higher watt density local to the ends of the hot runner nozzle to compensate for the heat sinks. Although the heat sinks are somewhat compensated for with the local higher watt densities of the heater, the temperature distribution along the hot runner nozzle still does not achieve a constant level and thus temperature variations remain in the molten resin, resulting in a less than optimal process. Additionally, existing prior art hot runner nozzle heaters typically have no means to compensate for variable heat sinks that exist within a multiple-drop cavity system nor inherent variations due to manufacturing tolerances of the nozzle bodies themselves.

SUMMARY

In one form of the present disclosure, a heater system is provided that comprises a heating target defining a primary heating direction along which a heating target power gradient occurs and a layered heater disposed proximate the heating target. The layered heater comprises at least one resistive layer defining a series circuit, the series circuit comprising a plurality of resistive traces. The resistive traces comprise a negative temperature coefficient material having a relatively high BETA coefficient material and the resistive traces are oriented approximately parallel to the primary heating direction. The resistive traces are responsive to the heating target power gradient such that the resistive traces output additional power proximate a higher heat sink and less power proximate a lower heat sink along the primary heating direction.

In another form of the present disclosure, a heater system is provided that comprises a heating target defining at least a first heating direction along which a first heating target power gradient occurs and at least a second heating direction along which a second heating target power gradient occurs. A layered heater is disposed proximate the heating target and comprises a first conductive layer comprising a plurality of adjacent conductor elements, and a resistive layer comprising a plurality of resistive regions applied on the conductor elements, wherein at least two resistive regions are applied to a single conductor element. The resistive regions comprise a negative temperature coefficient material having a relatively high BETA coefficient. The layered heater further comprises a first dielectric layer applied between the plurality of resistive regions and a second conductive layer. The second conductive layer comprises a plurality of adjacent conductor elements applied on the resistive regions and extending across adjacent conductor elements of the first conductive layer, and a pair of terminal pads applied on a corresponding pair of resistive regions. Additionally, a second dielectric layer applied over the second conductive layer but not over the terminal pads. The layered heater is responsive to the first and second heating target power gradients such that the resistive regions output additional power proximate a higher heat sink and less power proximate a lower heat sink along the first and second heating directions.

In yet another form of the present disclosure, a layered heater is provided for use proximate a heating target, the heating target defining a primary heating direction along which a heating target power gradient occurs. The layered heater comprises at least one resistive layer defining a plurality of resistive trace zones, each resistive trace zone comprising a different watt density than an adjacent resistive trace zone. The resistive layer further defines a resistive trace within the resistive trace zones, the resistive trace forming a series circuit and comprising a negative temperature coefficient material having a relatively high BETA coefficient and the resistive trace being oriented approximately parallel to the primary heating direction. Accordingly, the resistive trace is responsive to the heating target power gradient such that the resistive trace outputs additional power proximate a higher heat sink and less power proximate a lower heat sink along the primary heating direction.

In an additional another form of the present disclosure, a layered heater is provided for use proximate a heating target, the heating target defining a primary heating direction along which a heating target power gradient occurs. The layered heater comprises at least one resistive layer defining a series circuit, the series circuit comprising a plurality of resistive traces. The resistive traces comprise a negative temperature coefficient material having a relatively high BETA coefficient and the resistive traces are oriented approximately parallel to the primary heating direction. The resistive traces are responsive to the heating target power gradient such that the resistive trace outputs additional power proximate a higher heat sink and less power proximate a lower heat sink along the primary heating direction.

Further areas of applicability of the present disclosure will become apparent from the description provided hereinafter. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

Figure 1A:
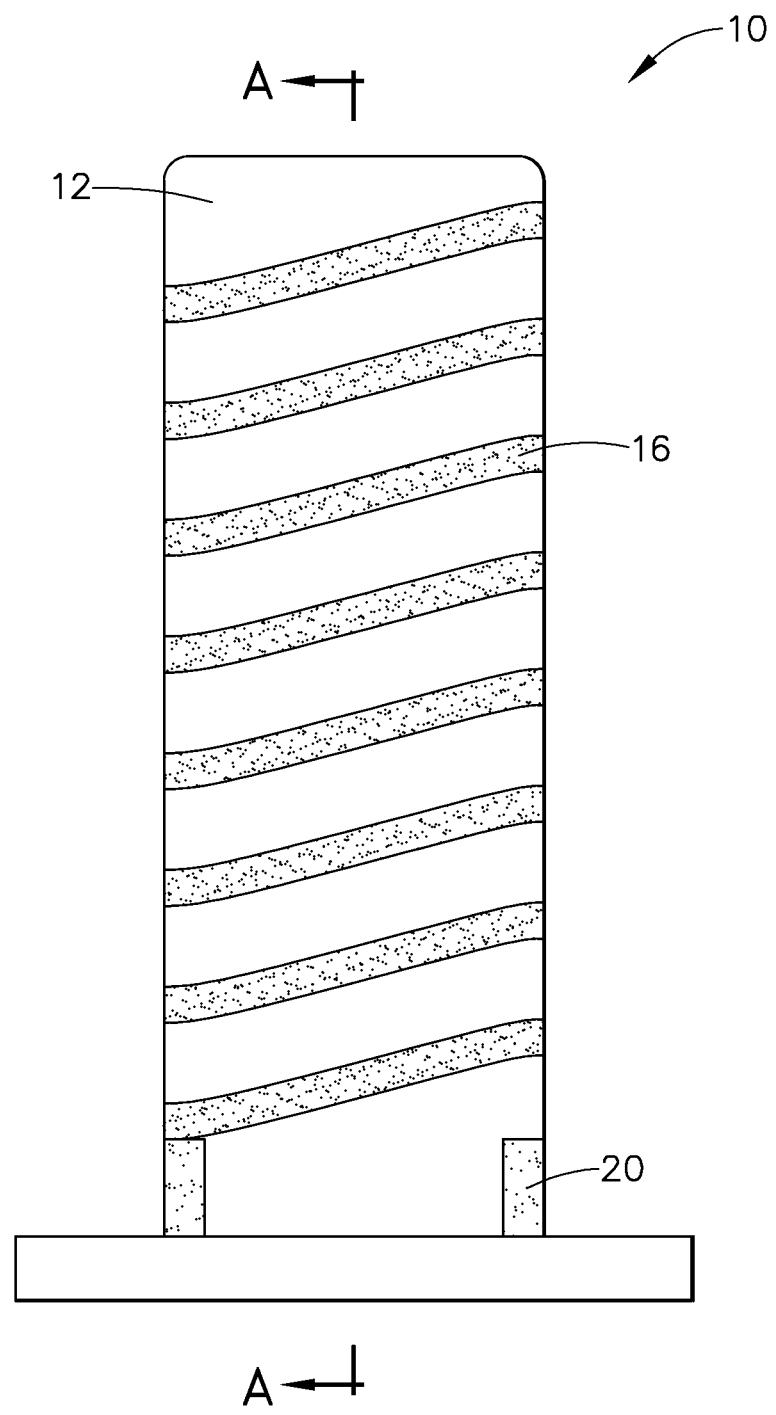
FIG. 1a is a side view of layered heater constructed in accordance with the principles of the present disclosure.
Figure 1B:
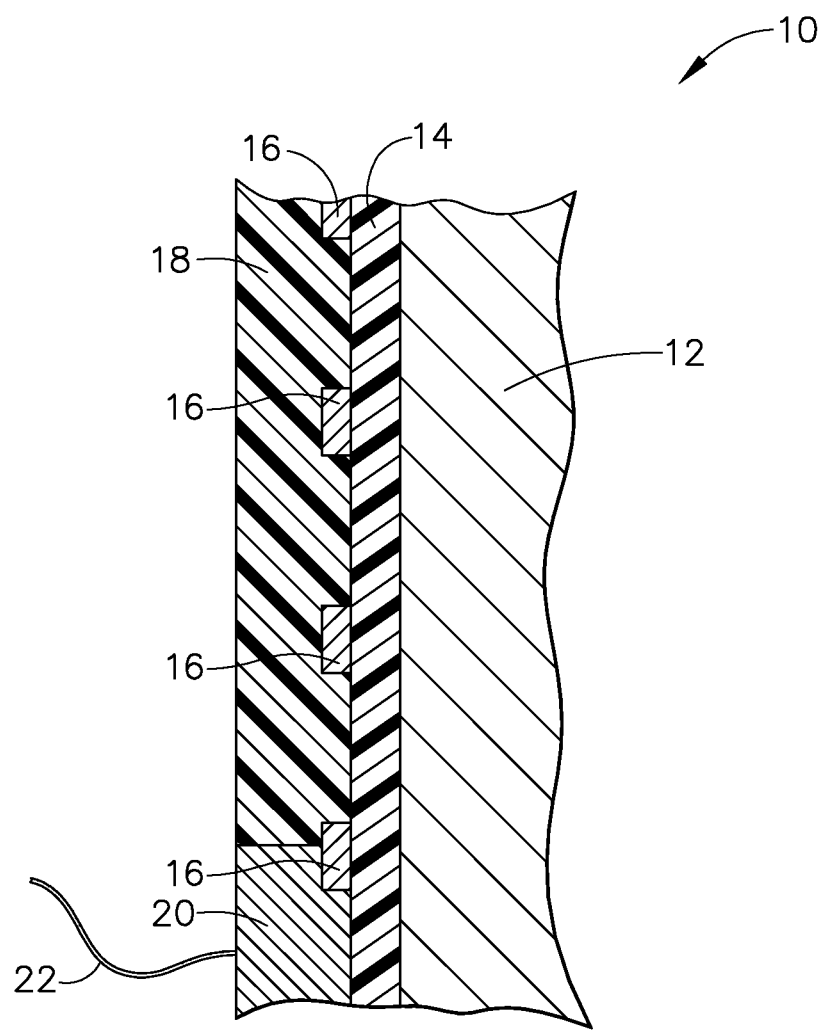
FIG. 1b is an enlarged partial cross-sectional side view, taken along line A-A of FIG. 1a, of a layered heater constructed in accordance with the principles of the present disclosure.

The following description is merely exemplary in nature and is in no way intended to limit the disclosure, its application, or uses. Referring to FIGS. 1a and 1b, a general illustration and description of a layered heater, which is indicated by reference numeral 10, is provided. Generally, the layered heater 10 comprises a number of layers disposed on a substrate 12, wherein the substrate 12 may be a separate element disposed proximate the part or device (not shown) to be heated, or the substrate 12 may be the part or device itself. The part or device is hereinafter referred to as a "heating target," which should be construed to mean any device, body, or medium that is intended to be heated such as a physical object or an environment adjacent the heater, e.g., air, fluid. Accordingly, the terms part, device, or target device, among others, should not be construed as limiting the scope of the present disclosure. The teachings of the present disclosure are applicable to any heating target, regardless of the form and/or composition of the heating target.

As best shown in FIG. 1b, the layers generally comprise a dielectric layer 14, a resistive layer 16, and a protective layer 18. The dielectric layer 14 provides electrical isolation between the substrate 12 and the resistive layer 16 and is formed on the substrate 12 in a thickness commensurate with the power output, applied voltage, intended application temperature, or combinations thereof, of the layered heater 10. The resistive layer 16 is formed on the dielectric layer 14 and provides a heater circuit for the layered heater 10, thereby providing the heat to the substrate 12. The protective layer 18 is formed on the resistive layer 16 and is preferably an insulator, however other materials such as an electrically or thermally conductive material may also be employed according to the requirements of a specific heating application.

As further shown, terminal pads 20 are generally disposed on the dielectric layer 14 and are in contact with the resistive layer 16. Accordingly, electrical leads 22 are in contact with the terminal pads 20 and connect the resistive layer 16 to a power source (not shown). (Only one terminal pad 20 and one electrical lead 22 are shown for clarity, and it should be understood that two terminal pads 20 with one electrical lead 22 per terminal pad 20 are often present in layered heaters). The terminal pads 20 are not required to be in contact with the dielectric layer 14, so long as the terminal pads 20 are electrically connected to the resistive layer 16 in some form. As further shown, the protective layer 18 is formed on the resistive layer 16 and is generally a dielectric material for electrical isolation and protection of the resistive layer 16 from the operating environment. Additionally, the protective layer 18 may cover a portion of the terminal pads 20 as shown so long as there remains sufficient area to promote an electrical connection with the power source.

As used herein, the term "layered heater" should be construed to include heaters that comprise at least one functional layer (e.g., dielectric layer 14, resistive layer 16, and protective layer 18, among others), wherein the layer is formed through application or accumulation of a material to a substrate or another layer using processes associated with thick film, thin film, thermal spraying, or solgel, among others. These processes are also referred to as "layered processes," "layering processes," or "layered heater processes." Such processes and functional layers are described in greater detail in co-pending U.S. patent application Ser. No. 10/752,359, titled "Combined Layering Technologies for Electric Heaters," filed on Jan. 6, 2004, which is commonly assigned with the present application and the contents of which are incorporated herein by reference in their entirety.

Figure 2:
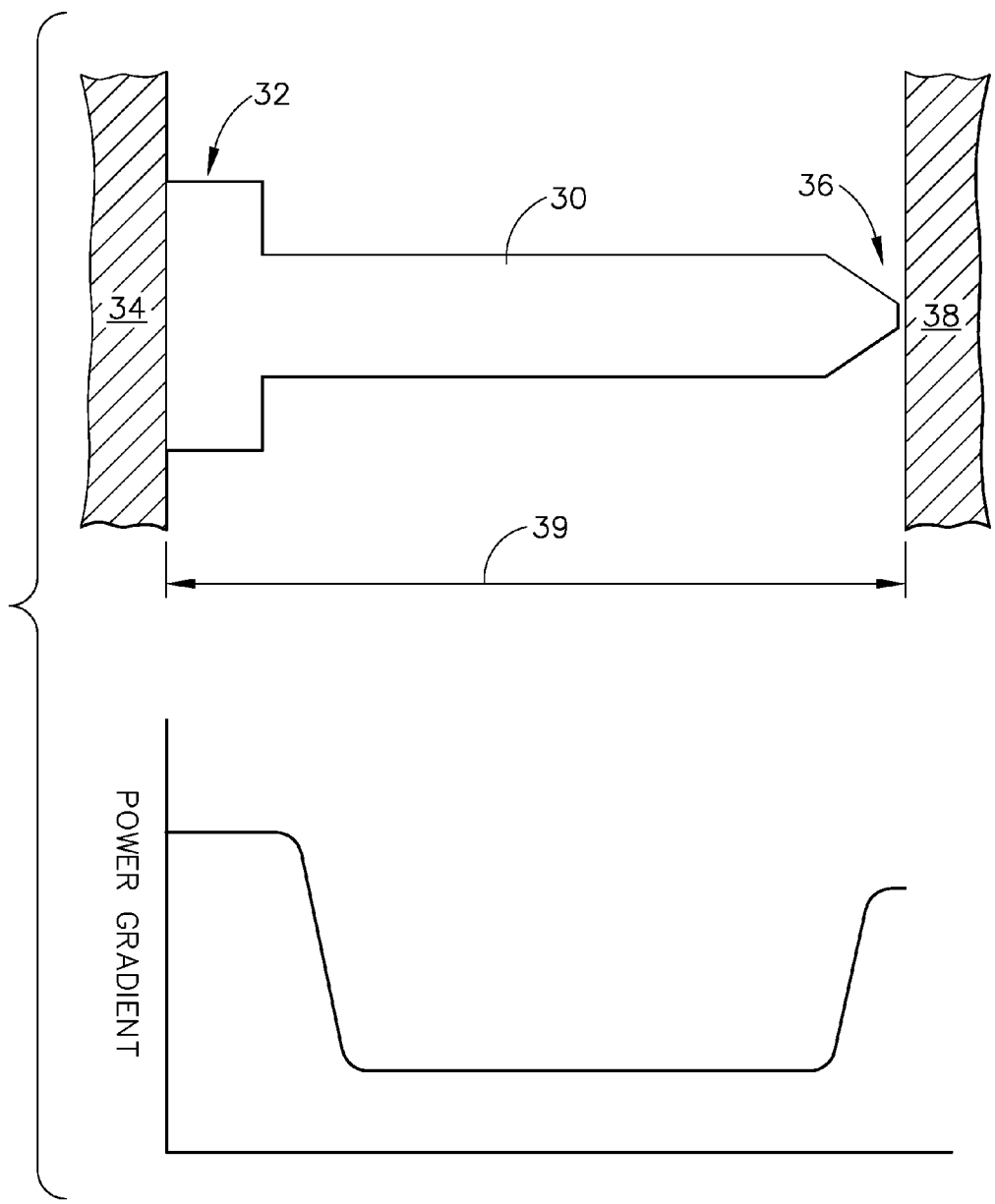
FIG. 2 is a side elevational view of a heating target in the form of a hot runner nozzle having a heating target power gradient in accordance with the principles of the present disclosure.

Referring now to FIG. 2, a heating target 30 is shown, which is illustrated as a hot runner nozzle in an exemplary form of the present invention. It should be understood that the teachings of the present disclosure are not limited to a hot runner nozzle and are applicable to a variety of other heating targets. Accordingly, the illustration and description of a hot runner nozzle application should not be construed as limiting the scope of the present disclosure.

As shown, the hot runner nozzle 30 defines a proximal end 32 and a distal end 36. The proximal end 32 is secured or positioned adjacent to a manifold 34 of an injection molding machine, and the distal end 36, often referred to as the "tip," is positioned adjacent the mold 38, where parts are formed during an injection molding process. As shown, the hot runner nozzle 30 comprises a primary heating direction 39, along which a heating target power gradient occurs as shown by the graph directly below the hot runner nozzle 30. Generally, more power is required at the proximal end 32 due to the heat sink of the manifold 34. Similarly, more power is required at the distal end 36 due to the heat sink of the mold 38. Accordingly, a power gradient occurs as a result of these heat sinks, which is undesirable when a substantially isothermal output, or even heat distribution, is desired to heat the molten resin flowing through the hot runner nozzle 30.

Figure 3:
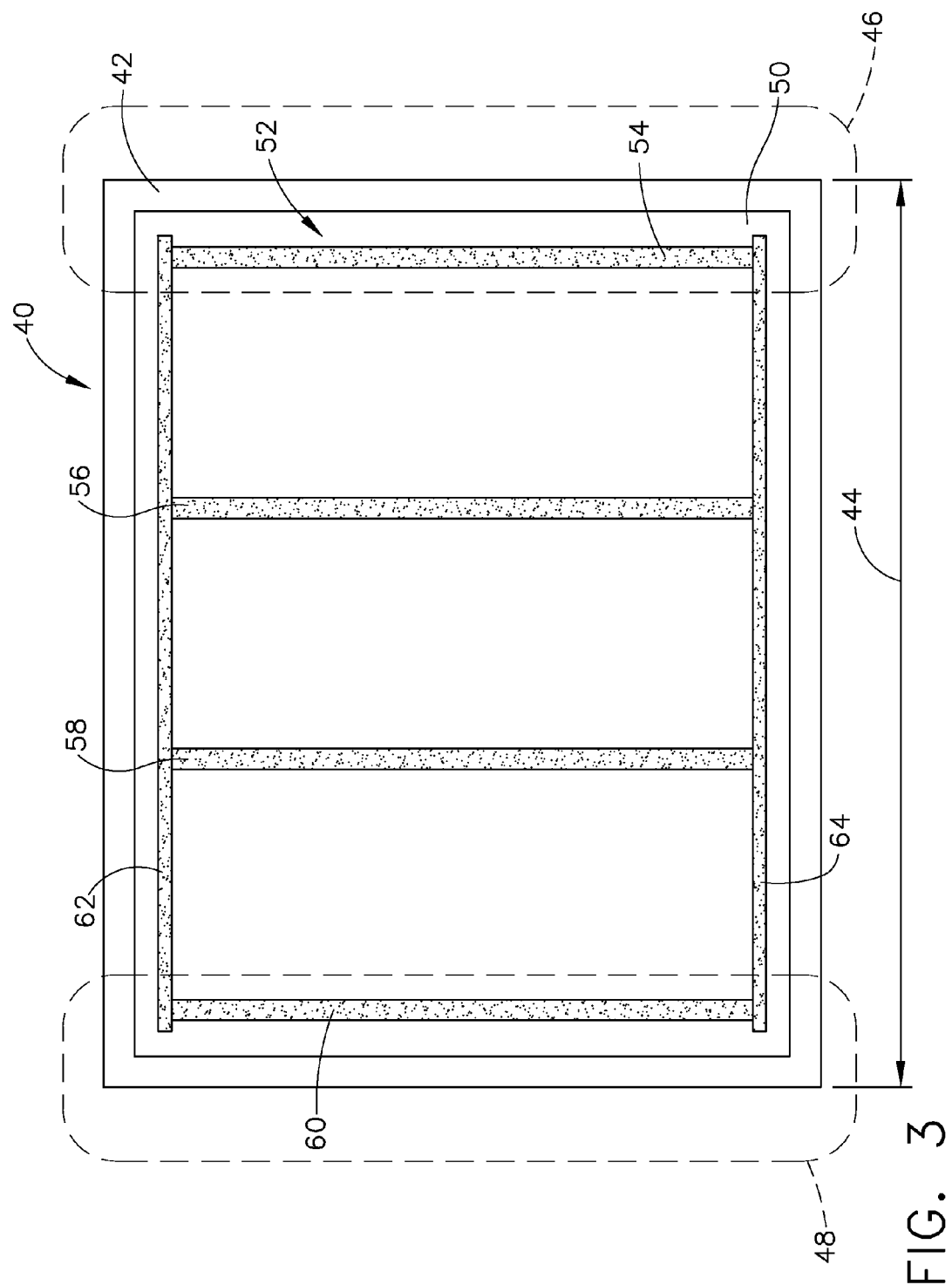
FIG. 3 is a plan view of a layered heater system comprising a layered heater with a parallel circuit configuration and a positive temperature coefficient (PTC) material having a relatively high temperature coefficient of resistance (TCR) in accordance with the principles of the present disclosure.

Referring now to FIG. 3, a layered heater system according to one form of the present disclosure is illustrated and generally indicated by reference numeral 40. As shown, the layered heater system 40 comprises a heating target 42 defining a primary heating direction 44, along which a heating target power gradient occurs as previously illustrated. A heat sink is present at end portion 46 (shown dashed), and another heat sink is present at end portion 48 (shown dashed), which are shown in these locations for exemplary purposes only. It should be understood that one or a plurality of heat sinks may be present along the primary heating direction 44, so long as a heating target power gradient is present. Additionally, the heating target 42 may be one of a plurality of applications such as the hot runner nozzle as previously described, among many others, and is illustrated as a two-dimensional heating target for purposes of clarity in describing the operating principles of the present disclosure. Application of the teachings of the present disclosure to a three-dimensional heating target such as a hot runner nozzle are illustrated and described in greater detail below.

As further shown, the layered heater system 40 comprises a layered heater 50 disposed proximate the heating target 42. The layered heater 50 comprises a resistive layer 52, wherein a plurality of resistive traces 54, 56, 58, and 60 define a parallel circuit as shown with power being applied to a first power bus 62 and a second power bus 64. As shown, the resistive traces 54, 56, 58, and 60 are oriented approximately perpendicular to the primary heating direction, the purpose of which will become clear with the following discussion of materials and electrical circuit principles. Additionally, the illustration of four (4) resistive traces 54, 56, 58, and 60 is exemplary only and should not be construed as limiting the scope of the present disclosure.

The material for the resistive traces is preferably a positive temperature coefficient (PTC) material that has a relatively high temperature coefficient of resistance (TCR). For example, a TCR value of 1,500 ppm/° C. was satisfactorily employed in one form of the present disclosure, which translates into a power increase of approximately 0.15% per degree centigrade (° C.) decrease in temperature. Depending on the extent of the heat sink, more or less power per degree of temperature change may be designed into the resistive traces by selecting a material having a specific TCR value. The higher the TCR value, the more additional power that will be delivered to the heat sink area, and likewise, the lower the TCR value, the less additional power that will be delivered to the heat sink area. Accordingly, a wide range of materials having different TCR values may be employed in accordance with the teachings of the present disclosure, and the examples described herein should not be construed as limiting the scope of the present disclosure. So long as the TCR characteristics of the resistive trace material are such that a change in temperature due to a local heat sink causes a corresponding change in resistance of the resistive traces, which translates into a corresponding change in power to compensate for the heat sink, such TCR characteristics should be construed as falling within the scope of the present disclosure.

In a parallel circuit, the voltage across each resistive trace 54, 56, 58, and 60 remains constant, and therefore, if the resistance in a particular resistive trace, e.g., 54, increases or decreases, the current must correspondingly decrease or increase in accordance with the constant applied voltage. The resistive traces 54 and 60 that are located proximate the end portions 46 and 48 will necessarily be of a lower temperature due to the heat sinks along the end portions 46 and 48.

Accordingly, with a PTC material having a relatively high TCR, the resistance of the resistive traces 54 and 60 will also decrease with the lower temperature relative to the temperature of traces 56 and 58. And with the constant voltage power supply, the current through the resistive traces 54 and 60 will increase relative to the current in traces 56 and 58, thus producing a higher power output to compensate for the heat sinks. Although the higher power output will in turn drive the temperature of the resistive traces 54 and 60 up, the overall power proximate end portions 46 and 48 will be higher than the power output between the end portions 46 and 48, i.e., through resistive traces 56 and 58 where there exists lower heat sinking.

Accordingly, in the areas of end portions 46 and 48, or areas of higher heat sink, the power of the layered heater 50 will increase to compensate for the heat sink, or additional draw of the end portions 46 and 48. Therefore, the increase in power output of the layered heater 50 enables a heating system capable of matching power output with the demands of the heating target 42.

With the resistive traces 54, 56, 58 and 60 being oriented approximately perpendicular to the primary heating direction, the material of the resistive traces 54, 56, 58 and 60 is able to react most efficiently and effectively to the heating target power gradient along the primary heating direction. For example, if a resistive trace were oriented parallel to the primary heating direction, and with a constant voltage being maintained across the resistive trace, the current would not be capable of changing at different locations along the resistive trace to compensate for the heating target power gradient. Thus, in a parallel circuit with a heating target power gradient along a primary heating direction and a PTC material having a relatively high TCR, the operating principles of the present disclosure are most effective when the resistive traces are oriented approximately perpendicular to the primary heating direction.

Figure 4:
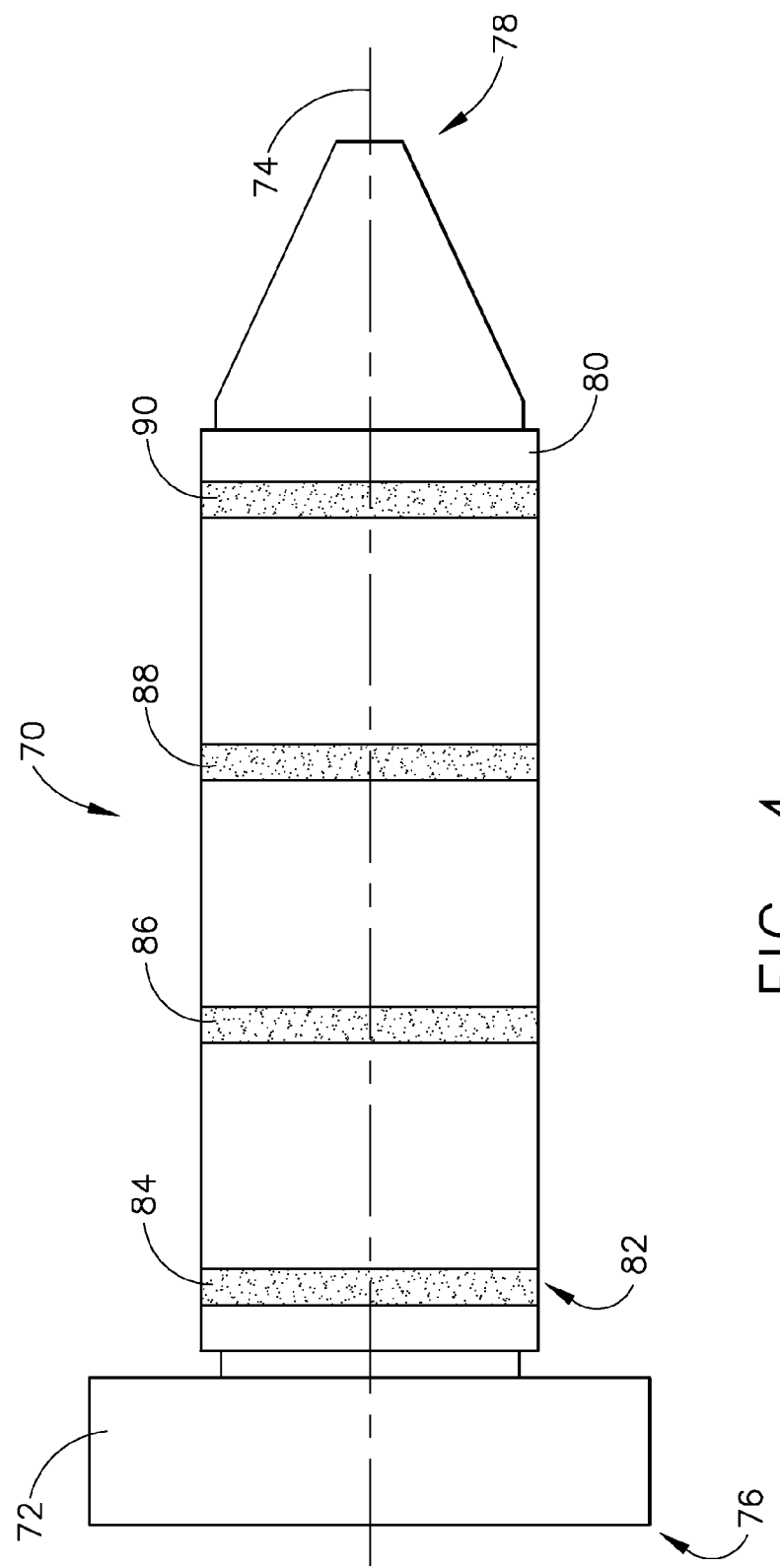
FIG. 4 is a side elevational view of a hot runner nozzle application with a layered heater having a parallel circuit configuration and a PTC material having a relatively high TCR in accordance with the principles of the present disclosure.

Referring now to FIG. 4, the principles of the present disclosure are illustrated in another embodiment of a layered heater system 70 for use in a hot runner nozzle 72. As shown, the layered heater system 70 comprises the hot runner nozzle 72 defining a longitudinal axis 74 extending between a manifold end 76 and a tip end 78. The layered heater system 70 further comprises a layered heater 80 disposed proximate the hot runner nozzle 72, wherein the layered heater 80 comprises at least one resistive layer 82 defining a parallel circuit as shown. The parallel circuit defines a plurality of resistive traces 84, 86, 88, and 90, which comprise a PTC material having a relatively high TCR. It should be understood that the illustration of four (4) resistive traces 84, 86, 88, and 90 is exemplary only and should not be construed as limiting the scope of the present disclosure. Further, the layered heater may be constructed according to the teachings of U.S. Pat. No. 5,973,296, which is commonly assigned with the present application, and the contents of which are incorporated herein by reference in their entirety. Additionally, the layered heater may be constructed according to the teachings of U.S. Pat. No. 6,575,729, which is also incorporated herein by reference in its entirety. For example, the layered heater 70 may be applied directly to the outer surface of the hot runner nozzle 72, or the layered heater 70 may be applied to a separate substrate (not shown) such as a sleeve that is disposed around the hot runner nozzle 72. Such construction techniques with and without a separate substrate are described in greater detail in co-owned U.S. Pat. No. 5,973,296, which has been incorporated herein by reference in its entirety.

As further shown, the resistive traces 84, 86, 88, and 90 are oriented approximately perpendicular to the longitudinal axis 74 of the hot runner nozzle 72. Accordingly, as previously described, the traces 84, 86, 88, and 90 are responsive to a heating target power gradient extending between the manifold end 76 and the tip end 78 such that the resistive traces 84 and 90 output additional power, and the resistive traces 86 and 88 output less power. As a result, the layered heater system 70 enables a more isothermal temperature distribution along the longitudinal axis 74, or the primary heating direction, which translates into a more constant temperature distribution throughout the molten resin (not shown) flowing through the hot runner nozzle 72.

Figure 5:
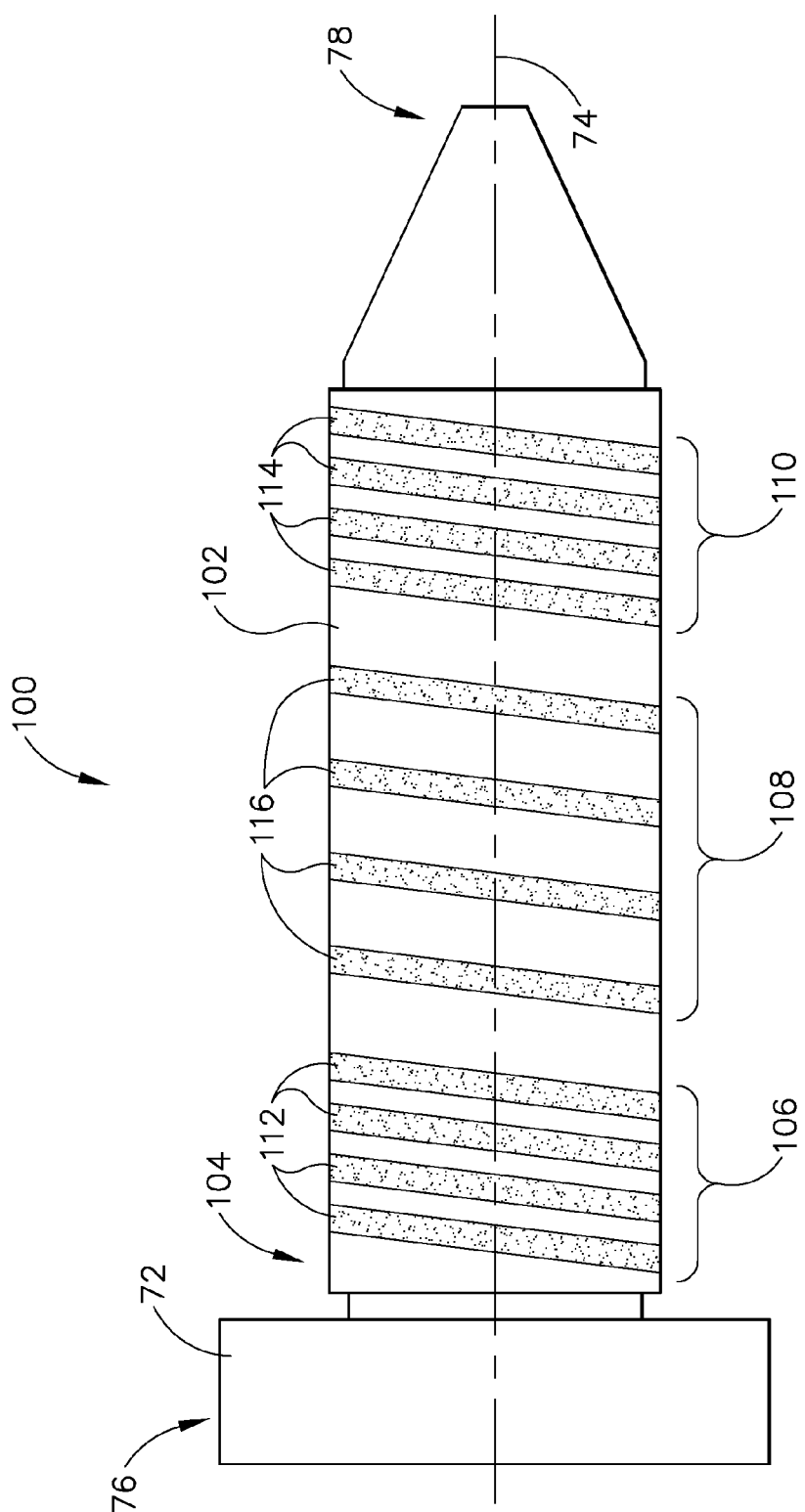
FIG. 5 is a side elevational view of a hot runner nozzle application with a layered heater having a parallel circuit configuration and a PTC material having a relatively high TCR with resistive trace zones in accordance with the principles of the present disclosure.

Referring now to FIG. 5, the principles of the present disclosure are applied to a hot runner nozzle 72 having an engineered resistive trace pattern that compensates for heat sinks. As shown, a layered heater system 100 comprises the hot runner nozzle 72 and a layered heater 102 disposed proximate the hot runner nozzle 72. The hot runner nozzle 72 defines the longitudinal axis 74 extending between the manifold end 76 and the tip end 78 as previously described, with a heating target power gradient occurring between the manifold end 76 and the tip end 78. As further shown, the layered heater 102 comprises at least one resistive layer 104 defining a plurality of resistive trace zones 106, 108, and 110. Resistive trace zones 106 and 110 each have higher watt densities in the form of resistive traces 112 and 114, respectively, that are spaced closer than the resistive traces 116 in resistive trace zone 108. Accordingly, each resistive trace zone, e.g, 106, comprises a different watt density than an adjacent resistive trace zone, e.g., 108, such that the resistive layer 104 is engineered to compensate for the heating target power gradient occurring along the longitudinal axis 74 of the hot runner nozzle 72. It should be understood that the watt density of each zone may also be varied using other techniques such as a variable width or thickness, among others, in addition to the variable spacing described herein. Such techniques are shown and described in copending U.S. application Ser. No. 10/797, 259, filed Mar. 10, 2004 and titled "Variable Watt Density Layered Heater System," which is commonly assigned with the present application and the contents of which are incorporated herein by reference in their entirety.

As further shown, the plurality of resistive traces 112, 114, and 116 within the resistive trace zones 106, 108, and 110 form a parallel circuit. Preferably, the resistive traces 112, 114, and 116 comprise a PTC material having a relatively high TCR, and the resistive traces 112, 114, and 116 are oriented approximately perpendicular to the longitudinal axis 74 of the hot runner nozzle 72 as shown. Accordingly, the resistive layer is responsive to a heating target power gradient extending between the manifold end 76 and the tip end 78 such that the resistive layer outputs additional power proximate the manifold end 76 and the tip end 78 relative to the power output between the manifold end 76 and the tip end 78.

Figure 6:
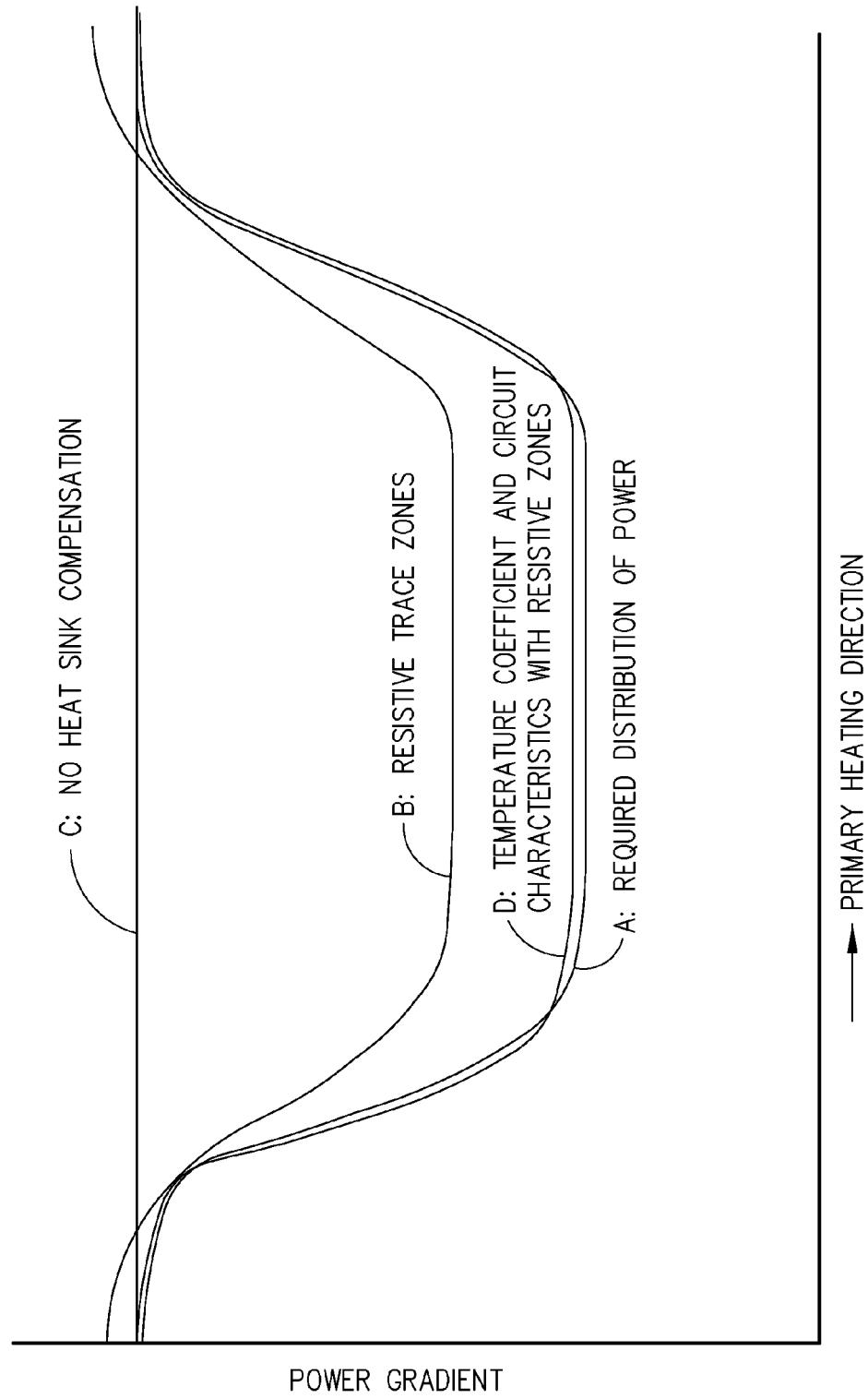
FIG. 6 is a graph illustrating the tailoring effect of the teachings of the present disclosure when applied to an engineered resistive trace having resistive trace zones in accordance with the principles of the present disclosure.

As shown in FIG. 6, the application of the present disclosure to an engineered resistive trace pattern having resistive trace zones that compensate for heat sinks further refines or tailors the ability of the layered heater to maintain a constant temperature along the heating target, e.g., hot runner nozzle 72. As shown, profile A represents the required power distribution, or demand profile, along a primary heating direction of the heating target in the presence of heat sinks as previously described and illustrated. Profile B represents the power gradient along the primary heating direction with the application of resistive trace zones, where the watt density of each resistive trace zone is varied according to the heating target power gradient. Although the regions along profile B compensate for the heat sinks, this profile does not match the demand profile A of the heating target. As further shown, profile C represents the power gradient along a primary heating direction without any features or characteristics that compensate for the heating target power gradient. And in accordance with the present disclosure, profile D represents the power gradient along the primary heating direction with the application of materials having specific temperature coefficient characteristics, and arranged in a specific circuit configuration and orientation, in addition to the application of resistive trace zones. As shown, profile D closely approximates profile A, or the demand profile of the heating target. Therefore, application of materials having specific temperature coefficient characteristics, and arranged in a specific circuit configuration and orientation, to an engineered resistive trace having resistive trace zones provides further refinement or fine-tuning of the layered heater 102 to compensate for heating target power gradients occurring along a heating target such that the layered heater 102 provides power commensurate with demands of the heating target.

Figure 7:
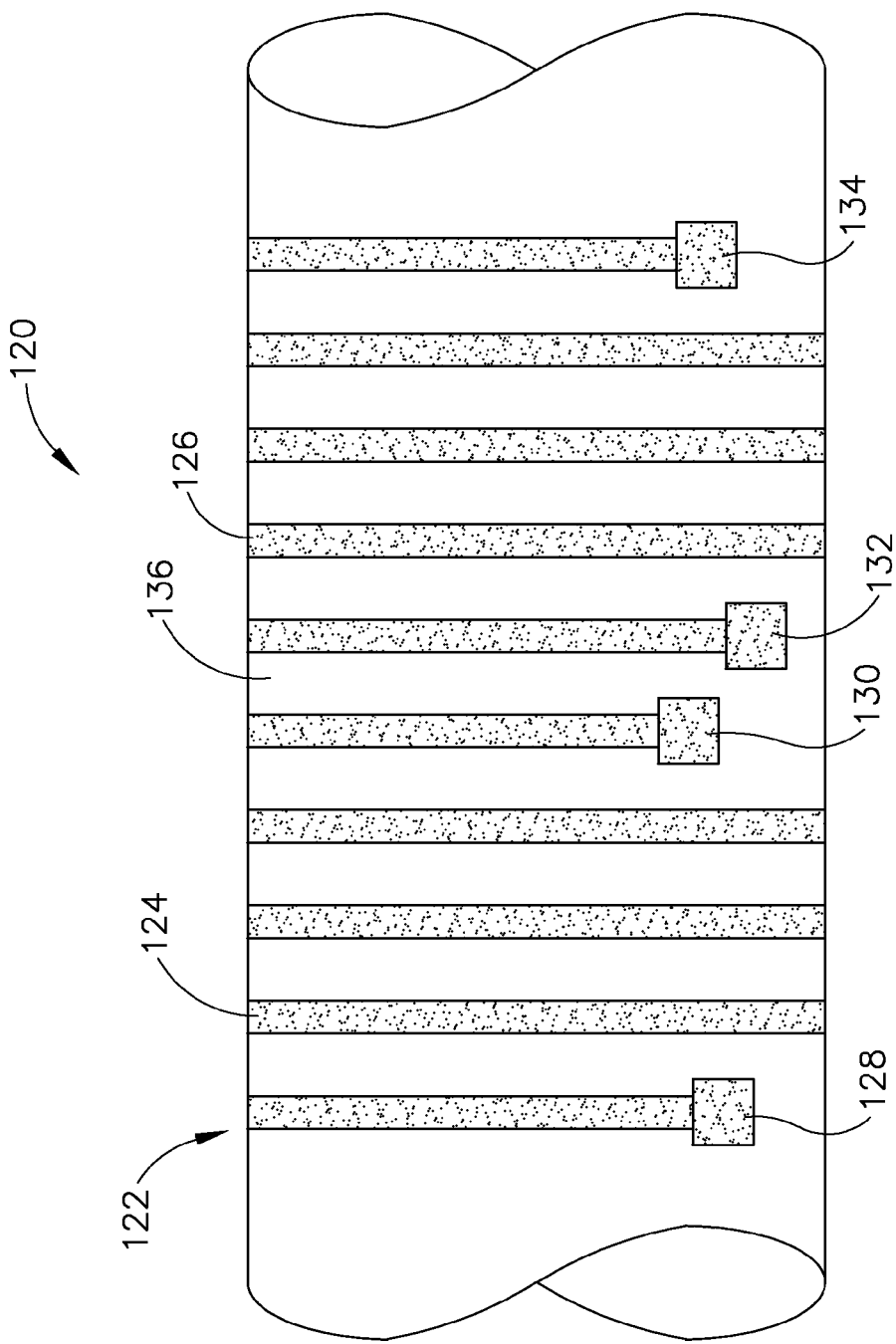
FIG. 7 is a side elevational view of one embodiment of a layered heater having terminations for lead wires and constructed in accordance with the principles of the present disclosure.

Referring now to FIG. 7, another form of the present disclosure is described and illustrated that provides terminations for resistive traces within resistive trace zones without a "cold spot" that typically occurs between power busses for parallel circuits. As shown, a layered heater 120 comprises at least one resistive layer 122 that defines a first resistive trace 124 and a second resistive trace 126 formed proximate the first resistive trace 124, each of which are shown as being "wrapped" around as a part of the layered heater 120. A positive terminal pad 128 is formed at one end of the first resistive trace 124, and a negative terminal pad 130 is formed at another end of the first resistive trace 124. Similarly, a positive terminal pad 132 is formed at one end of the second resistive trace 126, and a negative terminal pad 134 is formed at another end of the second resistive trace 126. As further shown, a dielectric layer 136 is formed over the first resistive trace 124 and the second resistive 126 trace but not over the terminal pads 128, 130, 132, and 134. Accordingly, the positive terminal pad 128 formed at one end of the first resistive trace 124 is adapted for connection to the positive terminal pad 132 formed at one end of the second resistive trace 126, and the negative terminal pad 130 formed at another end of the first resistive trace 124 is adapted for connection to the negative terminal pad 134 formed at another end of the second resistive trace 126 such that a parallel circuit configuration is formed. The terminal pads 128, 130, 132, 134 may be connected by a variety of methods including, but not limited to, hard wiring, a printed connection, or terminal bars, among others. Advantageously, with the terminal connections as illustrated and described, the resistive traces 124 and 126 provide more uniform heating of a heating target (not shown) and reduce the "cold spot" that occurs with known layered heaters having parallel circuit configurations. It should be understood that the illustration of two (2) resistive traces 124 and 126 is not intended to limit the scope of the present disclosure and that a plurality of resistive traces may be connected with the terminal connections according to the teachings herein while remaining within the scope of the present disclosure. Additionally, the resistive traces may also form configurations other than being "wrapped" around as a part of the layered heater while remaining within the scope of the present disclosure. For example, the resistive traces may be formed as a part of a two-dimensional layered heater as previously illustrated.

Figure 8:
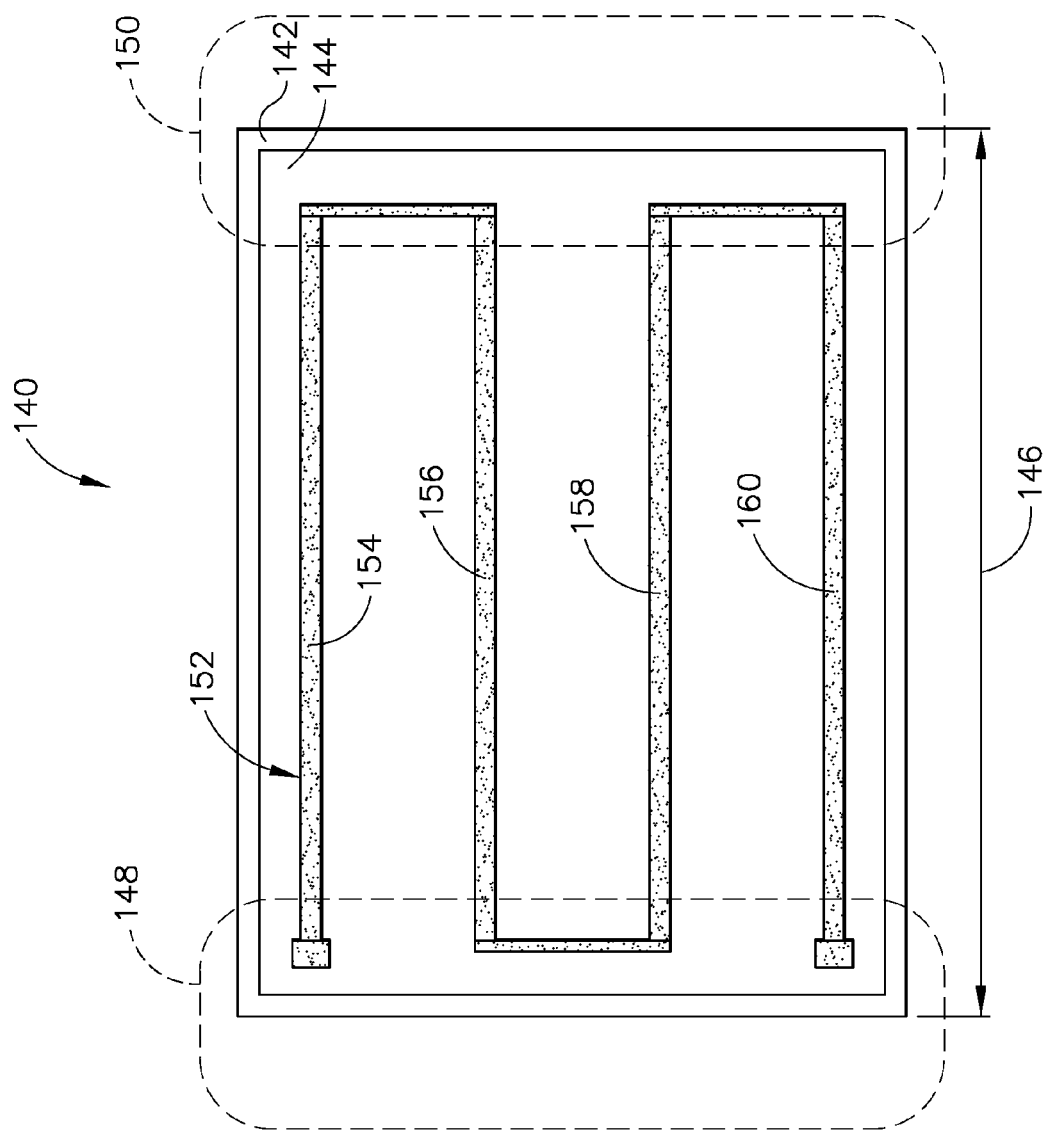
FIG. 8 is a plan view of a layered heater system comprising a layered heater with a series circuit configuration having a plurality of resistive traces and an NTC material having a relatively high BETA coefficient in accordance with the principles of the present disclosure.

Yet another form of the present disclosure is illustrated in FIG. 8, wherein a layered heater system 140 is illustrated comprising a heating target 142 and a layered heater 144 disposed proximate the heating target 142. As with previous embodiments, the heating target 142 defines a primary heating direction 146 along which a heating target power gradient occurs, with a heat sink at end portion 148 and at end portion 150 (both shown dashed). The layered heater 144 comprises at least one resistive layer 152, wherein a plurality of resistive traces 154, 156, 158, and 160 define a series circuit as shown. Preferably, the resistive traces 154, 156, 158, and 160 comprise a negative temperature coefficient (NTC) material having a relatively high BETA coefficient material.

Generally, the BETA coefficient (B) is defined as a material constant of an NTC thermistor, which is a measure of its resistance at one temperature compared to its resistance at a different temperature. The BETA value may be calculated by the equation shown below and is expressed in degrees Kelvin (° K):

$$\beta = \ln(R@T1/R@T2)/((T2-1)-(T1-1)) \qquad \text{Equation 1}$$

Accordingly, the resistance of this material decreases with increasing temperature. And as further shown, the resistive traces 154, 156, 158, and 160 are oriented approximately parallel to the primary heating direction 146.

In a series circuit, the current through each resistive trace 154, 156, 158, and 160 remains constant, and therefore, if the resistance in a particular portion of a resistive trace increases or decreases, the voltage must correspondingly decrease or increase in accordance with the constant current. With an NTC material having relatively high BET A coefficient, the resistance of the resistive traces 154, 156, 158, and 160 will increase with decreasing temperature proximate the end portions 148 and 150 (heat sinks), and thus the voltage will correspondingly increase to maintain the constant current. Therefore, the voltage increase will cause an increase in the power output of the layered heater 144 proximate the end portions 148 and 150 relative to the region between end portions 148 and 150, thus enabling a heating system capable of matching power output with the demands of the heating target 142.

Additionally, with the resistive traces 154, 156, 158, and 160 being oriented approximately parallel to the primary heating direction, the material of the resistive traces 154, 156, 158, and 160 is able to react more efficiently and effectively to the heating target power gradient along the primary heating direction. Thus, in a series circuit with a heating target power gradient along a primary heating direction and a NTC material having a relatively high BETA coefficient, the operating principles of the present disclosure are most effective when the resistive traces are oriented approximately parallel to the primary heating direction. And as with the parallel circuit configurations with a PTC material having a relatively high TCR, the higher the BET A coefficient, the higher the power output to compensate for the heat sink(s). Likewise, the lower the BETA coefficient, the lower the power output to compensate for the heat sink(s). Accordingly, the BETA coefficient will vary depending on the application and the magnitude of the heat sink(s). So long as the BETA characteristics of the resistive trace material are such that a change in temperature due to a local heat sink causes a corresponding change in resistance of the resistive traces, which translates into a corresponding change in power to compensate for the heat sink, such BETA characteristics should be construed as falling within the scope of the present disclosure.

Figure 9:
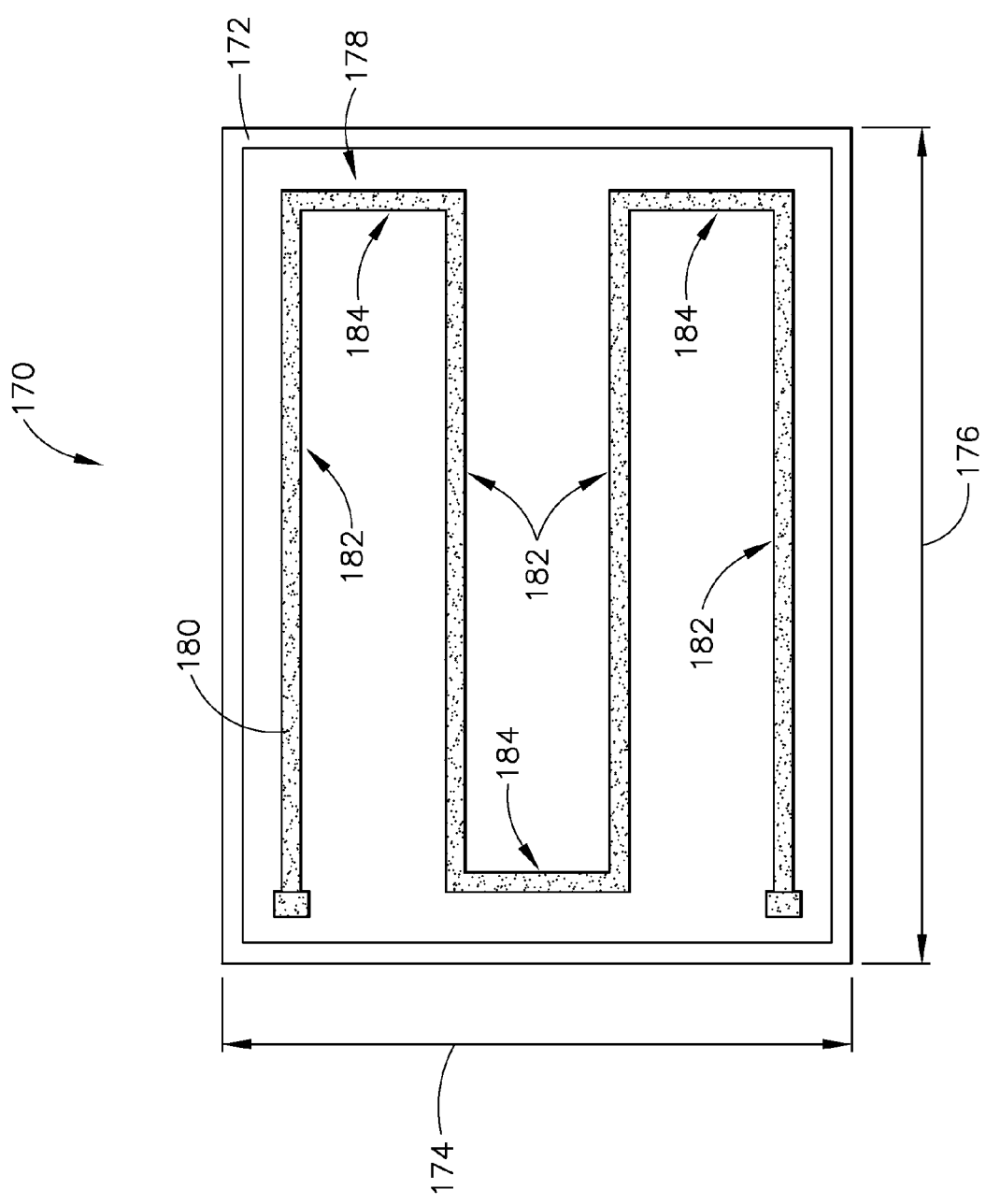
FIG. 9 is a plan view of a layered heater system comprising a layered heater with a series circuit configuration having a single resistive trace and a negative temperature coefficient (NTC) material having a relatively high BETA coefficient in accordance with the principles of the present disclosure.

Yet another form of a series circuit configuration is illustrated in FIG. 9, wherein a layered heater 170 is disposed proximate a heating target 172, and the heating target 172 defines at least a first heating direction 174 along which a first heating target power gradient occurs and a second heating direction 176 along which a second heating target power gradient occurs. The layered heater 170 comprises at least one resistive layer 178 defining a series circuit as shown, with a single resistive trace 180. Generally, the resistive trace 180 defines horizontal portions 182 and vertical portions 184 as shown. Preferably, the resistive trace 180 comprises an NTC material having a relatively high BETA coefficient such that the resistive trace 180 is responsive to the heating target power gradients to output additional power proximate a higher heat sink and less power proximate a lower heat sink along the heating directions 174 and 176. As previously described, if the resistance in a particular portion, e.g., vertical portion 184, increases or decreases, the voltage must correspondingly decrease or increase in accordance with the constant current. With an NTC material having relatively high BETA coefficient, the resistance of each portion 182 and 184 will increase with decreasing temperature, (proximate any heat sinks), and thus the voltage will correspondingly increase to maintain the constant current. Therefore, the voltage increase will cause an increase in the power output of the layered heater 174 proximate any heat sinks, thus enabling a heating system capable of matching power output with the demands of a heating target. Further, it should be understood that the embodiment illustrated and described is not limited to only two (2) heating directions and that a plurality of heating directions may be accommodated with a corresponding plurality of resistive trace portions while remaining within the scope of the present disclosure.

Figure 10:
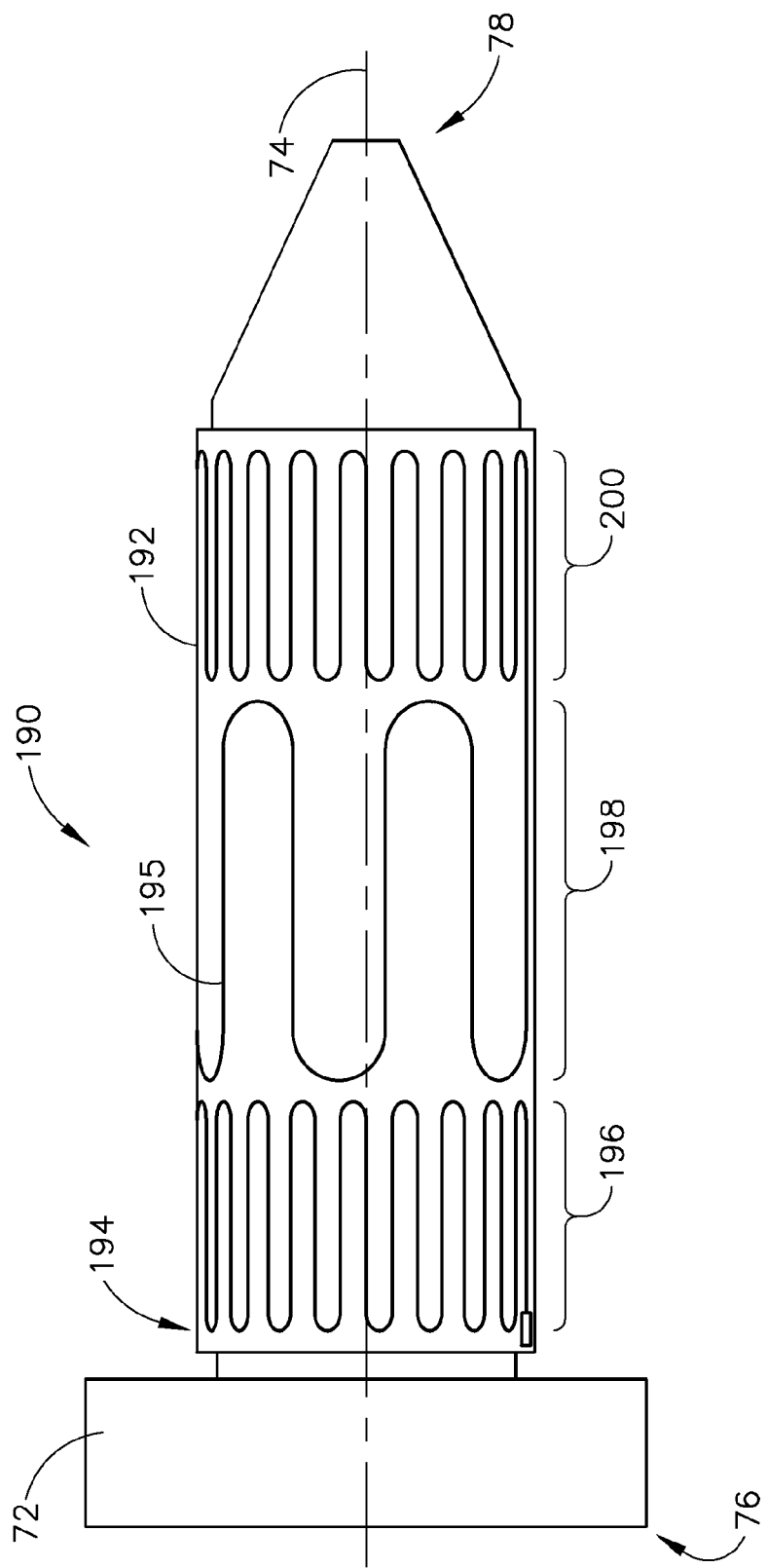
FIG. 10 is a side elevational view of a hot runner nozzle application with a layered heater having a series circuit configuration and a negative temperature coefficient (NTC) material having a relatively high BETA coefficient in accordance with the principles of the present disclosure.

Referring now to FIG. 10, another form of the present disclosure is illustrated with a series circuit configuration and NTC material as previously described applied to hot runner nozzle 72, along with resistive trace zones. As shown, a heater system 190 comprises the hot runner nozzle 72 with the longitudinal axis 74 extending between the manifold end 76 and tip end 78, along with a layered heater 192 disposed proximate the hot runner nozzle 72. The layered heater 192 comprises at least one resistive layer 194 defining a resistive trace 195 and a plurality of resistive trace zones 196, 198, and 200. Resistive trace zones 196 and 200 each have higher watt densities in the form of spacing that is closer than the resistive trace zone 198. Accordingly, as described above with the parallel circuit configuration, each resistive trace zone 196, 198, and 200 comprises a different watt density than an adjacent resistive trace zone in order to compensate for the heating target power gradient. It should be understood that the variable watt density approaches as described and incorporated by reference above with the parallel circuit configuration with resistive trace zones may also be employed with the series configuration illustrated herein while remaining within the scope of the present disclosure.

As further shown, the resistive trace 195 forms a series circuit and preferably comprises an NTC material having a relatively high BETA coefficient. Accordingly, as previously described herein with NTC materials in a series circuit, the resistive layer 194 is responsive to the heating target power gradient extending between the manifold end 76 and the tip end 78 such that the resistive layer 194 outputs additional power proximate the manifold end 76 and the tip end 78 relative to the power provided between the manifold end 76 and the tip end 78.

Figure 11:
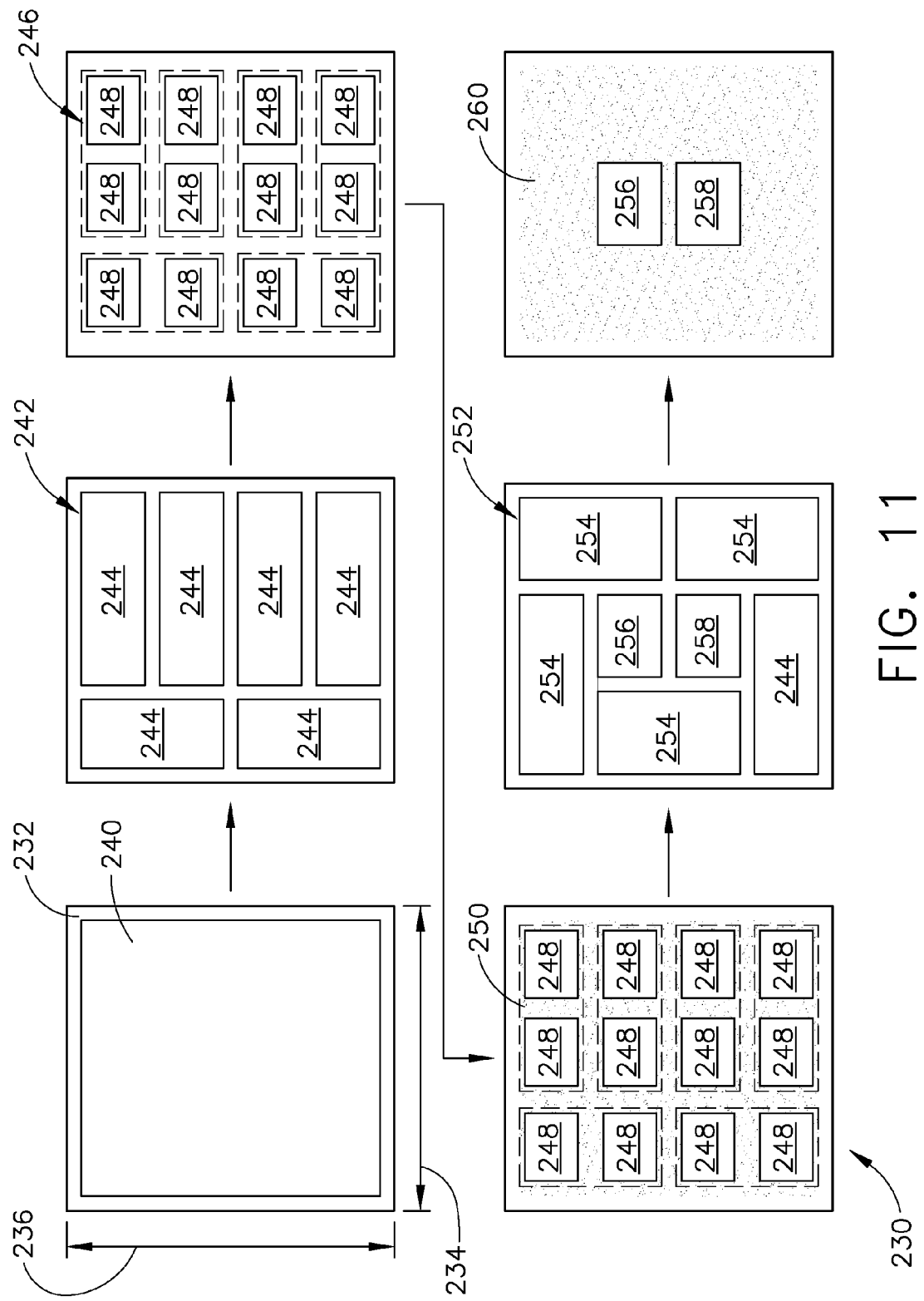
FIG. 11 is a series of plan views illustrating the construction of a layered heater having a series circuit configuration and an NTC material with a relatively high BETA coefficient to accommodate more than one primary heating direction in accordance with the principles of the present disclosure.
Figure 12:
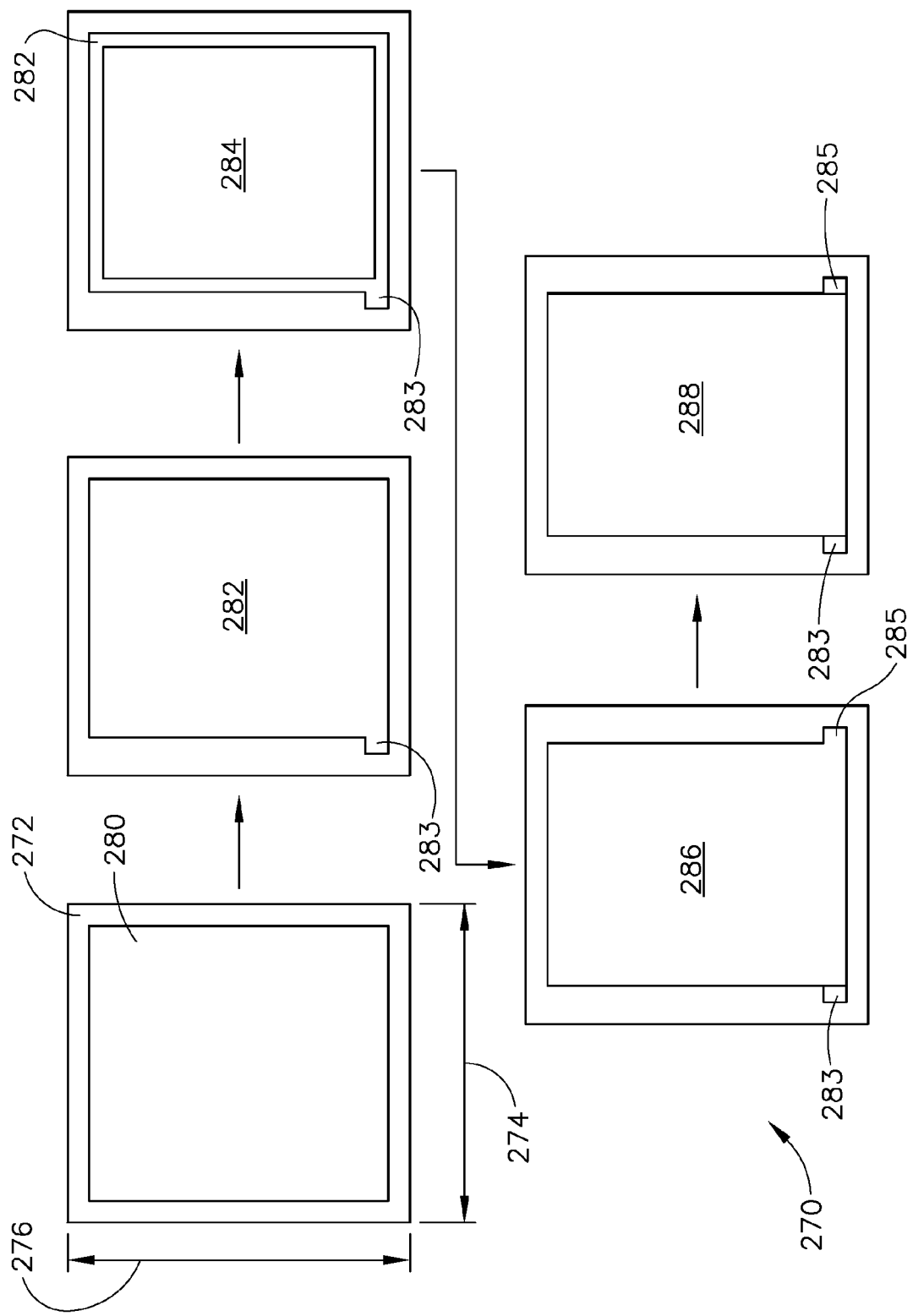
FIG. 12 is a series of plan views illustrating the construction of a layered heater having a parallel circuit configuration and a PTC material with a relatively high TCR to accommodate more than one primary heating direction in accordance with the principles of the present disclosure.

To accommodate more than one primary heating direction of a heating target, additional embodiments of the present disclosure are provided as shown in FIGS. 11 and 12. Referring first to FIG. 11, a layered heater system 230 comprises a heating target 232 defining a first heating direction 234 and a second heating direction 236. It should be understood that the teachings of the present disclosure may be applied to a heating target having a plurality of heating directions, and the illustration of only two heating directions herein should not be construed as limiting the scope of the present disclosure. Along the first heating direction 234, a first heating target power gradient occurs. Similarly, a second heating target power gradient occurs along the second heating direction 236.

The layered heater system 230 further comprises a layered heater 240 disposed proximate the heating target 232, the construction of which is described layer-by-layer for purposes of clarity. As shown, the layered heater 240 comprises a first conductive layer 242 comprising a plurality of adjacent conductor elements 244. The conductor elements 244 may be applied directly to the heating target 232 or to a dielectric layer (not shown) according to the material and requirements of the specific heating target 232. As further shown, a resistive layer 246 comprises a plurality of resistive regions 248 applied on the conductor elements 244, wherein at least two resistive regions 248 are applied to a single conductor element 244. Preferably, the resistive regions 248 comprise an NTC material having a relatively high BETA coefficient.

A first dielectric layer 250 is then applied between the plurality of resistive regions 248 as shown. Next, a second conductive layer 252 is applied, wherein the second conductive layer 252 comprises a plurality of adjacent conductor elements 254 applied on the resistive regions 248 and extending across adjacent conductor elements 244 of the first conductive layer 242. The second conductive layer 252 further comprises a pair of terminal pads 256 and 258 that are applied on a corresponding pair of resistive regions 248 as shown. Finally, a second dielectric layer 260 is applied over the second conductive layer 252 but not over the terminal pads 256 and 258.

Accordingly, the layered heater 240 is responsive to the first and second power gradients of the heating directions 234 and 236 such that the resistive regions 248 output additional power proximate a higher heat sink and less power proximate a lower heat sink due to the series circuit configuration combined with the NTC material having a relatively high BETA coefficient as previously described.

Referring now to FIG. 12, another form of the present disclosure is a layered heater system 270 comprises a heating target 272 defining a first heating direction 274 and a second heating direction 276. Along the first heating direction 274, a first heating target power gradient occurs. Similarly, a second heating target power gradient occurs along the second heating direction 276. The layered heater system 270 further comprises a layered heater 280 disposed proximate the heating target 272, the construction of which is now described layer-by-layer for purposes of clarity.

As shown, the layered heater 280 comprises a first conductive layer 282 and a resistive layer 284 applied on the first conductive layer 282. The first conductive layer 282 also defines a terminal tab 283 for connection of a lead wire (not shown) in order to power the layered heater 280. Preferably, the resistive layer 284 comprises a PTC material having a relatively high TCR. As further shown, a second conductive layer 286 is applied on the resistive layer 284, and a dielectric layer 288 is applied on the second conductive layer 286. Additionally, the second conductive layer 286 defines a terminal tab 285 for connection of a second lead wire (not shown) to the layered heater 280.

Accordingly, the layered heater 280 is responsive to the first and second heating target power gradients of the heating directions 274 and 276 such that the resistive layer 284 outputs additional power proximate a higher heat sink and less power proximate a lower heat sink in accordance with the teachings of the present disclosure. Furthermore, due to the continuous nature of the resistive layer 284, i.e., without individual resistive traces as previously described, the resistive layer 284 is inherently responsive to a plurality of heating directions with a corresponding plurality of heat sinks regardless of the orientation of the heating directions relative to the resistive layer 284.

Figure 13:
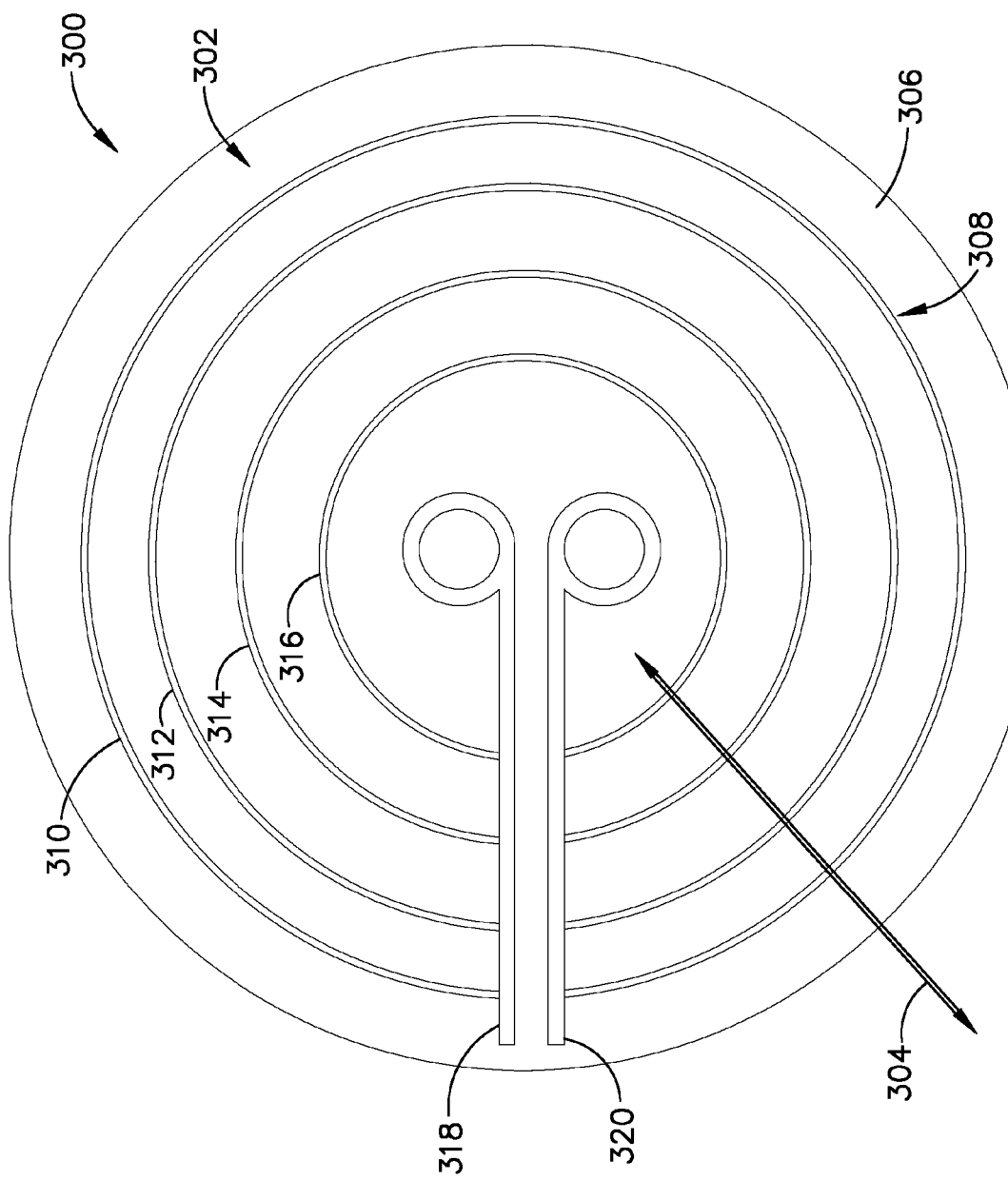
FIG. 13 is a plan view of a layered heater system disposed proximate a circular heating target with a parallel circuit configuration and a positive temperature coefficient (PTC) material having a relatively high temperature coefficient of resistance (TCR) in accordance with the principles of the present disclosure.

Yet another form of the present disclosure is illustrated in FIG. 13, wherein a layered heater system 300 comprises a heating target 302 defining a circular configuration with a primary heating direction 304 that extends radially as shown, along which a heating target power gradient occurs as previously described. A heat sink is present around the periphery of the heating target 302, wherein the heating target 302 in one form may be a hot plate for heating an object such as a beaker. As further shown, the layered heater system 300 comprises a layered heater 306 disposed proximate the heating target 302. The layered heater 306 comprises a resistive layer 308, wherein a plurality of resistive traces 310, 312, 314, and 316 define a parallel circuit as shown with power being applied to a first power bus 318 and a second power bus 320. As shown, the resistive traces 310, 312, 314, and 316 are oriented approximately perpendicular to the primary heating direction and are arranged in a parallel circuit configuration. Additionally, the resistive traces 310, 312, 314, and 316 comprise a PTC material having a relatively high TCR. Accordingly, in the area of the heat sink around the periphery of the heating target 302, the power of the layered heater 306 will increase to compensate for the heat sink, or additional draw around the periphery. As a result, the power proximate resistive traces 310 and 312 will be higher relative to the power proximate resistive traces 314 and 316 in accordance with the teachings of the present disclosure. Thus, the layered heater system 300 compensates according to the size of the object placed on the heating target 302.

Figure 14:
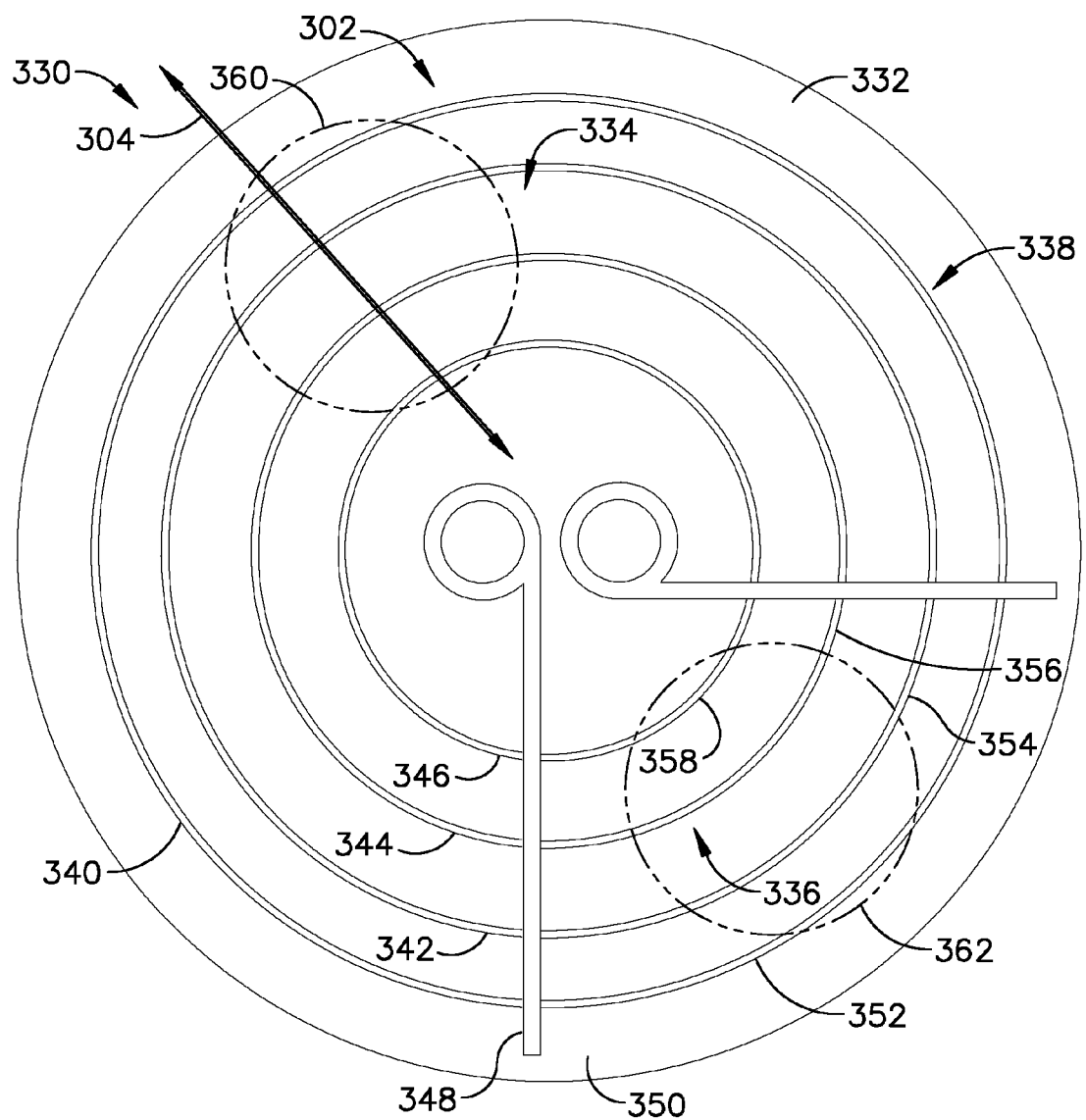
FIG. 14 is a plan view of a layered heater system disposed proximate a circular heating target having zones and constructed in accordance with the principles of the present disclosure.

Referring to FIG. 14, yet another form of a layered heater system for the circular heating target 302 is illustrated and generally indicated by reference numeral 330. This layered heater system 330 comprises layered heater 332 disposed proximate the heating target 302. The layered heater 332 defines a plurality of zones 334 and 336 to compensate for an object (e.g., beaker, not shown) that is not centered on the heating target 302 or for a plurality of objects placed on the heating target 302. Although only two (2) zones 334 and 336 are illustrated, it should be understood that more than two (2) zones may be employed while remaining within the scope of the present disclosure. The layered heater 332 further comprises a resistive layer 338, wherein a plurality of resistive traces 340, 342, 344, and 346 are disposed within zone 334 and extend between a first power bus 348 and a second power bus 350. Additionally, the layered heater 332 comprises a plurality of resistive traces 352, 354, 356, and 358 disposed within zone 336, which also extend between the first power bus 348 and the second power bus 350. As previously described, the resistive traces 340, 342, 344, 346, 352, 354, 356, and 358 are oriented approximately perpendicular to the primary heating direction 304 and are arranged in a parallel circuit configuration. Additionally, these resistive traces comprise a PTC material having a relatively high TCR. Accordingly, the power proximate resistive traces 340, 342, 352, and 354 will be higher relative to the power proximate resistive traces 344, 346, 356, and 358 in accordance with the teachings of the present disclosure. Moreover, each of the zones 334 and 336 provide local power according to the demands within each of these zones to compensate for an object that is not centered on the heating target 302, or to compensate for a plurality of objects placed on the heating target 302, for example, one beaker 360 (shown dashed) in zone 334 and another beaker 362 (shown dashed) in zone 336.

The description of the invention is merely exemplary in nature and, thus, variations that do not depart from the gist of the invention are intended to be within the scope of the invention. For example, the layered heater systems and layered heaters as described herein may be employed with a two-wire controller as shown and described in co-pending U.S. patent application Ser. No. 10/719,327, titled "Two-Wire Layered Heater System," filed Nov. 21, 2003, which is commonly assigned with the present application and the contents of which are incorporated herein by reference in their entirety. Such variations are not to be regarded as a departure from the spirit and scope of the invention.

What is claimed is:

1. A heater system comprising:
a heating target defining a primary heating direction along which a heating target power gradient occurs; and
a layered heater disposed proximate the heating target, the layered heater comprising at least one resistive layer defining a series circuit, the series circuit comprising a plurality of resistive traces, the resistive traces comprising a negative temperature coefficient material having a relatively high BETA coefficient material and the resistive traces being oriented approximately parallel to the primary heating direction, wherein the resistive traces are responsive to the heating target power gradient such that the resistive traces output additional power proximate a higher heat sink and less power proximate a lower heat sink along the primary heating direction.

2. The heater system according to claim 1, wherein the layered heater is applied directly to the heating target.

3. The heater system according to claim 1, further comprising a substrate disposed proximate the heating target, wherein the layered heater is applied to the substrate.

4. The heater system according to claim 1, wherein the heating target is a hot runner nozzle defining a longitudinal axis extending between a manifold end and a tip end of the hot runner nozzle.

5. The heater system according to claim 4, wherein the resistive trace is responsive to the heating target power gradient extending between the manifold end and the tip end such that the resistive trace outputs additional power proximate the higher heat sink adjacent the manifold end, and the lower heat sink near the tip end and less power between the manifold end and the tip end.

6. The heater system according to claim 1, further comprising a two-wire controller, and the two-wire controller comprising:
two electrical lead wires connected to the resistive layer,
a power source,
a voltage and current measurement component,
a power regulator component, and
a microprocessor in communication with the heater system, wherein the two-wire controller determines temperature of the layered heater system using the resistance of the resistive layer and simultaneously controls heater temperature accordingly through the two electrical lead wires.

7. The heater system according to claim 6, wherein the current measurement component is further defined as a shunt resistor for calculation of the resistance of the resistive layer.

8. A heater system comprising:
a heating target defining at least a first heating direction along which a first heating target power gradient occurs and at least a second heating direction along which a second heating target power gradient occurs; and
a layered heater disposed proximate the heating target, the layered heater comprising:

a first conductive layer comprising a plurality of adjacent conductor elements;

a resistive layer comprising a plurality of resistive regions applied on the conductor elements, wherein at least two resistive regions are applied to a single conductor element, the resistive regions comprising a negative temperature coefficient material having a relatively high BETA coefficient;

a first dielectric layer applied between the plurality of resistive regions;

a second conductive layer comprising:

a plurality of adjacent conductor elements applied on the resistive regions and extending across adjacent conductor elements of the first conductive layer; and a pair of terminal pads applied on a corresponding pair of resistive regions; and a second dielectric layer applied over the second conductive layer but not over the terminal pads, wherein the layered heater is responsive to the first and second heating target power gradients such that the resistive regions output additional power proximate a higher heat sink and less power proximate a lower heat sink along the first and second heating directions.

9. The heater system according to claim 8, wherein the layered heater is applied directly to the heating target.

10. The heater system according to claim 8, further comprising a substrate disposed proximate the heating target, wherein the layered heater is applied to the substrate.

11. A layered heater for use proximate a heating target, the heating target defining a plurality of heating directions along which heating target power gradients occur, the layered heater comprising at least one resistive layer defining:

a plurality of resistive trace zones, each resistive trace zone comprising a different watt density than an adjacent resistive trace zone; and a resistive trace within the resistive trace zones, the resistive trace forming a series circuit and comprising a negative temperature coefficient material having a relatively high BETA coefficient, wherein the resistive trace is responsive to the heating target power gradients such that the resistive trace outputs additional power proximate a higher heat sink and less power proximate a lower heat sink along the primary heating directions.

12. The layered heater system according to claim 11, wherein the layered heater is applied directly to the heating target.

13. The layered heater system according to claim 11, further comprising a substrate disposed proximate the heating target, wherein the layered heater is applied to the substrate.

14. A layered heater for use proximate a heating target, the heating target defining a primary heating direction along which a heating target power gradient occurs, the layered heater comprising:

at least one resistive layer defining a series circuit, the series circuit comprising a plurality of resistive traces, the resistive traces comprising a negative temperature coefficient material having a relatively high BETA coefficient and the resistive traces being oriented approximately parallel to the primary heating direction, wherein the resistive traces are responsive to the heating target power gradient such that the resistive traces output additional power proximate a higher heat sink and less power proximate a lower heat sink along the primary heating direction.

15. The layered heater according to claim 14, wherein the layered heater is applied directly to the heating target.

16. The layered heater according to claim 14, further comprising a substrate disposed proximate the heating target, wherein the layered heater is applied to the substrate.

17. The layered heater according to claim 14, wherein the heating target is a hot runner nozzle defining a longitudinal axis extending between a manifold end and a tip end of the hot runner nozzle.

18. The layered heater according to claim 17, wherein the resistive trace is responsive to the heating target power gradient extending between the manifold end and the tip end such that the resistive trace outputs additional power proximate the higher heat sink is positioned adjacent the manifold end, and the lower heat sink is near the tip end and less power between the manifold end and the tip end.

19. The layered heater according to claim 14, further comprising a two-wire controller, and the two-wire controller comprising:

two electrical lead wires connected to the resistive layer, a power source, a voltage and current measurement component, a power regulator component, and a microprocessor in communication with the heater system, wherein the two-wire controller determines temperature of the layered heater system using the resistance of the resistive layer and simultaneously controls heater temperature accordingly through the two electrical lead wires.

20. The layered heater according to claim 19, wherein the current measurement component is further defined as a shunt resistor for calculation of the resistance of the resistive layer.

* * * * *